US008763446B2

(12) United States Patent
Middelbeek et al.

(10) Patent No.: US 8,763,446 B2
(45) Date of Patent: Jul. 1, 2014

(54) TUBE WELD STEAM TEST DEVICE AND METHOD

(75) Inventors: Hans Almer Middelbeek, Boxmeer (NL); Jozefus A. C. Smit, Boxmeer (NL)

(73) Assignee: Intervet International B.V., Boxmeer (NL)

( * ) Notice: Subject to any disclaimer, the term of this patent is extended or adjusted under 35 U.S.C. 154(b) by 254 days.

(21) Appl. No.: 13/383,457

(22) PCT Filed: Jul. 12, 2010

(86) PCT No.: PCT/EP2010/059978
§ 371 (c)(1),
(2), (4) Date: Jan. 11, 2012

(87) PCT Pub. No.: WO2011/006867
PCT Pub. Date: Jan. 20, 2011

(65) Prior Publication Data
US 2012/0111094 A1    May 10, 2012

Related U.S. Application Data

(60) Provisional application No. 61/225,036, filed on Jul. 13, 2009.

(30) Foreign Application Priority Data

Jul. 13, 2009 (EP) .................................... 09165298

(51) Int. Cl.
*G01M 3/04* (2006.01)
(52) U.S. Cl.
USPC ................. 73/49.5; 73/40; 73/49.1; 138/100; 156/64

(58) Field of Classification Search
USPC .............. 73/37, 40–52; 156/64; 138/100–102
See application file for complete search history.

(56) References Cited

U.S. PATENT DOCUMENTS

| 4,922,746 | A | 5/1990 | Hulsman et al. |
| 6,094,969 | A * | 8/2000 | Loos et al. ........................ 73/37 |
| 7,555,936 | B2 * | 7/2009 | Deckard ........................ 73/49.5 |
| 2012/0266661 | A1 * | 10/2012 | Fritjofsson ..................... 73/49.1 |
| 2012/0291525 | A1 * | 11/2012 | Fritjofsson et al. ............... 73/40 |

FOREIGN PATENT DOCUMENTS

| DE | 10 2006 005 257 A1 | 8/2007 |
| DE | 10 2007 012 147 A1 | 9/2008 |
| DE | 102007012147 A1 * | 9/2008 |
| WO | 96/21141 A1 | 7/1996 |
| WO | 2005/005949 A1 | 1/2005 |
| WO | 2008/110150 A1 | 9/2008 |

OTHER PUBLICATIONS

International Search Report for corresponding PCT Application No. PCT/EP2010/059978, dated Oct. 4, 2010.

* cited by examiner

*Primary Examiner* — Hezron E Williams
*Assistant Examiner* — Hoang Nguyen

(57) ABSTRACT

A tube weld seam test method and device for testing a tube weld seam (32) of a flexible tube (18) for leaks having: a first pinching device (10) and a second pinching device (12) for pinching closed the flexible tube (18) at a first position (A) and at a second position (B), the weld seam to be tested being arranged between the first and second positions (A; B); a compressing mechanism arranged for partly compressing a tube section enclosed between the first and second pinching devices (10; 12); and a pressure test device (14) arranged for testing an internal pressure of said tube section in order to test the tube weld seam for leaks.

20 Claims, 1 Drawing Sheet

TUBE WELD STEAM TEST DEVICE AND METHOD

CROSS-REFERENCE TO RELATED APPLICATIONS

Figure 1:
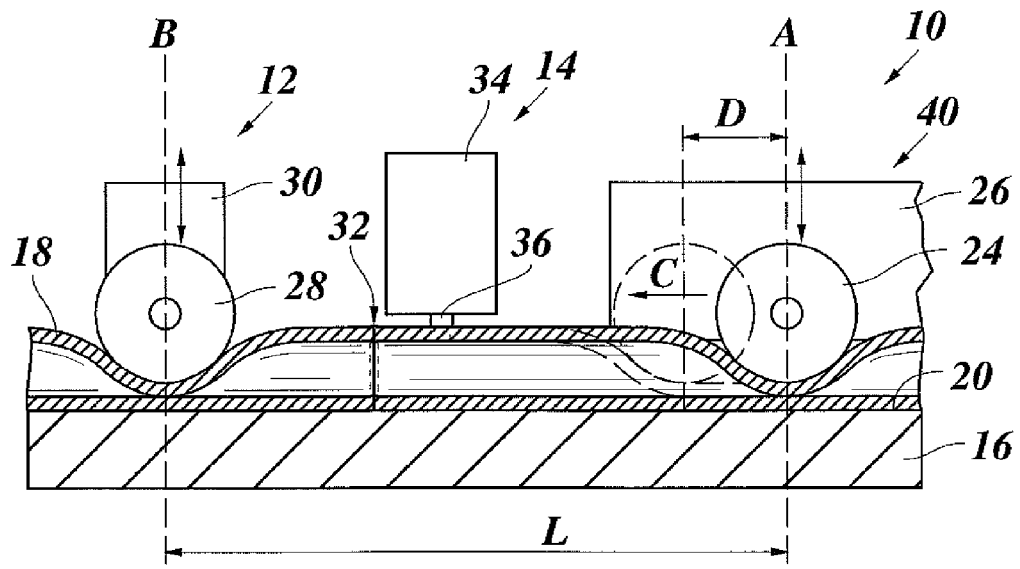

This application is a national stage entry under 35 U.S.C. 5371 of PCT/EP2010/059978, filed on Jul. 12, 2010, which claims priority to U.S. Provisional Application No. 61/225,036, filed on Jul. 13, 2009, and EP Application No. 09165298.2, filed on Jul. 13, 2009. The content of PCT/EP2010/059978 is hereby incorporated by reference in its entirety.

The invention relates to a tube weld seam test device and a method of testing a tube weld seam of a flexible tube for leaks, in particular a tube weld seam test device and a method of testing a circumferential tube weld seam of a flexible tube for leaks.

More specifically, the device or method is for testing a tube weld seam of a flexible tube, the inside of which is sterilized.

For a lot of applications, for example in the field of medical devices or food manufacturing devices, tubes of synthetic material have to be fused or welded together while maintaining a clean and sterilized condition of the tubes.

For example, in a welding device, two parallel tubes are transversally cut using a sterilized hot blade, the tubes are laterally shifted relative to one another, and an end of the first tube is pressed against an opposing end of the second tube. Thereby, the tubes are thermally welded together. The resulting tube has a circumferential weld seam.

The quality of the weld seam may for example be tested manually by stretching and slightly twisting the tube. In case of a poor weld seam, the tube will break at a circumferential line at the weld seam.

It is an object of the invention to provide a test device and test method that allows testing a tube weld seam for leaks with an improved reliability.

Furthermore, it has been found that the stress exerted on the tube weld seam by stretching and twisting the tube is not equivalent to the stress that occurs during actual use of the tube. For example, when an internal pressure of the tube gets too high, the tube will not break transversally or circumferentially, but the tube will break along the longitudinal direction at the weld seam. Longitudinal tears may, for example, occur at positions where the tube has been folded while cutting the tube.

Therefore, it would be desirable to provide a test device or test method for testing a tube weld seam of a flexible tube for leaks that allows exerting a stress on the tube for testing, which stress resembles a stress occurring in actual use of the tube.

Furthermore, it would be highly desirable to provide a test device of test method that allows maintaining a sterilized condition of the inside of the tube.

To better address one or more of these concerns, in a first aspect of the invention, a tube weld seam test device for testing a tube weld seam of a flexible tube for leaks is provided, comprising:

a first pinching device and a second pinching device for pinching closed the flexible tube at a first position and at a second position distant from the first position;

a compression mechanism arranged for partly compressing a tube section enclosed between the first and second pinching devices, when the tube is pinched closed by the first and second pinching devices; and a pressure test device arranged for testing an internal pressure of said tube section.

In particular, the pressure test device is arranged for testing the internal pressure of the tube section from the outside of the flexible tube by measuring a variable of the tube that corresponds to the internal pressure, without piercing through the tube wall (thus leaving the tube wall intact). This way, contamination the interior of the flexible tube can be avoided. Such a variable may for example be deformation of the tube (if the internal pressure is increased or decreased, a flexible tube will deform). Deformation of the tube can be measured for example by assessing whether the tube is stretched locally (by applying for example a strain gauge), or by measuring displacement of a wall section (if a tube is partly fixed, a section of the wall may displace due to a varying internal pressure), or by measuring a change in turbidity of the tube wall (for a partly transparent material, the turbidity may change depending on the strain on the material), by measuring the tube wall thickness (which can be measured for example using ultrasound or light scattering etc.), or by measuring the refractive index of the wall, etc. In an embodiment, the variable is measured at two or more sites of the tube section (or even two or more different variables are measured at different sites) and the outcome is a mean value. This may increase the accuracy of the test device.

The tube section enclosed between the first and second pinching devices is partly compressed in order to increase the internal pressure in this tube section. If the tube section enclosed between the first and second pinching devices comprises a weld seam, the weld seam may be tested for leaks: if the weld seam is tight, the internal pressure of the tube section will increase in accordance with the volume reduction by compressing the tube section and will then remain constant; if the weld seam comprises a leak, the internal pressure of the tube section will not increase as expected or will decay afterwards. Thus, the tube weld seam test device allows classifying the tube weld seam e.g. as good or bad, that is, as tight or having a leak.

The pressure test device which may be placed against the outer periphery of the flexible tube in order to the measure, from the outside, the internal pressure that is transmitted through the flexible wall of the tube.

In one embodiment, the compressing mechanism is adapted for shortening the length of a non-pinched section of the flexible tube between the first and second pinching devices. For example, the compressing mechanism may be adapted for shortening said length without interruption, in order to ensure that the gas filling the tube section is substantially completely transferred into the shortened tube section. For example, by shortening the length of the non-pinched tube section, the volume of this section may be reduced proportional to the amount of shortening said length. Thus, for example, a theoretical test pressure may be computed from the volume reduction of the tube section. For example, the test pressure may be calibrated based on the shortening of the length of said tube section.

For example, the compressing mechanism comprises at least one movable pinching member of the first pinching device, said pinching member being forcibly movable towards the second pinching device while pinching closed the flexible tube. Thereby, the length of the non-pinched tube section between first and second pinching devices may be shortened continuously.

For example, the movable pinching member comprises or is a roller. Using a roller for pinching closed the flexible tube and moving the roller towards the second pinching device may reduce friction exerted on the flexible tube.

The tube weld seam test device may further comprise a support for the flexible tube, the support extending at least between the first and second pinching devices for supporting the flexible tube during testing the tube weld seam.

For example, the first pinching device may comprise a pinching member for pinching closed the flexible tube between the pinching member and the support, and the second pinching device may comprise a second pinching member for pinching closed the flexible tube between the second pinching member and the support.

The second pinching member may also comprise or be a roller. For example, the second pinching member may be forcibly movable towards the first pinching device while pinching closed the flexible tube. Alternatively, only the first pinching member may be movable along the longitudinal direction of the tube and support.

The pressure test device may comprise a displacement or pressure sensor adapted for being placed against the flexible tube from outside. For example, the displacement or pressure sensor may be placed against an outer wall of the flexible tube. For example, the sensor may be placed against the flexible tube on the side opposite to the support. Thus, the flexible tube may be arranged between the support and the sensor.

For example, the displacement or pressure sensor may be adapted for sensing the internal pressure of the flexible tube transmitted through the tube wall when the sensor is placed against the flexible tube.

In one embodiment, the pressure test device is a deformation test device arranged for testing a deformation of the wall of the flexible tube. An increased internal pressure inside of the flexible tube section will lead to a deformation (expansion) of the tube section, and this deformation may, for example, be sensed by a displacement sensor.

In a further aspect of the invention, a method of testing a tube weld seam of a flexible tube for leaks is provided, comprising:

pinching closed the flexible tube at a first position and at a second position, a tube weld seam to be tested being located between the first and second positions;

partly compressing a tube section between the first and second positions, and testing an internal pressure of the tube section.

In particular, the internal pressure is tested from the outside of the flexible tube by measuring a variable of the tube that corresponds to the internal pressure, without piercing through the tube wall (thus leaving the tube wall intact), as explained here-above. The weld seam may be a circumferential weld seam.

For example, the method further comprises classifying the tube weld seam based on the tested internal pressure. For example, classifying the tube weld seam may comprise or may be identifying the tube weld seam as good or bad.

For example, more than one tube weld seam may be located between the first and second positions and may be tested. Thus, said tube weld seams may be classified as a group.

For example, the step of testing an internal pressure may be performed after and/or while partly compressing the tube section.

For example, said tube section is a closed section of the flexible tube between the first and second positions, which section is not being pinched, and a step of partly compressing said tube section comprises moving at least the first position, at which the flexible tube is pinched closed, towards the second position, thereby shortening the length of the non-pinched closed tube section between the first and second positions.

For example, in the step of pinching closed the flexible tube at the first position, a pinching member is used for pinching closed the flexible tube at the first position, and the step of partly compressing the tube section comprises moving said pinching member along the flexible tube. Thereby, for example, the first position, at which the pinching member pinches closed the flexible tube, is moved towards the second position.

For example, in the step of testing an internal pressure of the tube section, a displacement or pressure sensor is used, which is placed against the flexible tube.

For example, the step of testing an internal pressure of the tube section is a step of testing a deformation of the tube section. Thus, the tube weld seam(s) may be classified based on the tested deformation.

Figure 2:
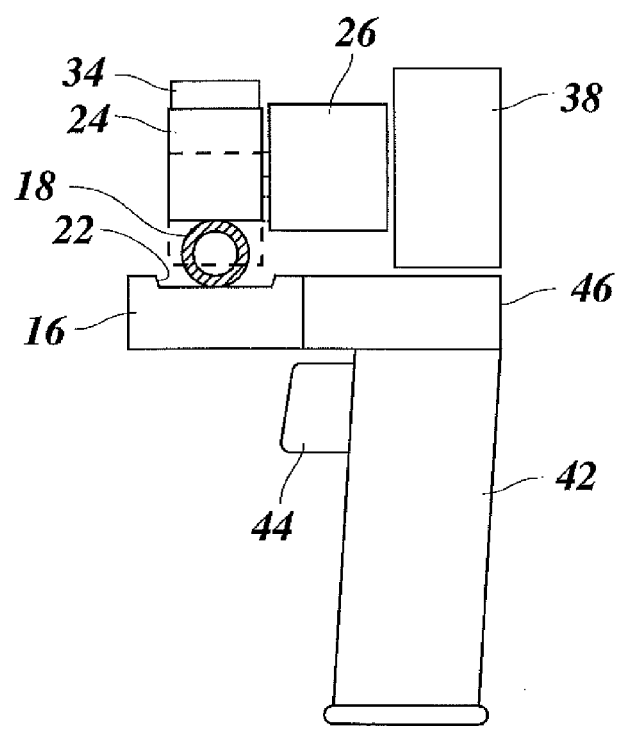

A preferred embodiment of the invention will now be described in conjunction with the drawings, in which:

FIG. 1 schematically shows a tube weld seam test device and a flexible tube to be tested; and FIG. 2 schematically shows a side view of a tube weld seam test device in the form of a hand tool.

The tube weld seam test device shown in FIG. 1 comprises a first pinching device 10, a second pinching device 12 and a deformation test sensor 14 arranged between the pinching devices 10, 12. A common, linear support 16 for a flexible tube 18 extends between the first and second pinching devices 10, 12. For example, the support 16 forms a straight surface plane 20 for supporting the flexible tube 18 in a straight condition. For example, as is shown in the example of FIG. 2, the surface plane 20 may be the bottom of a longitudinal groove formed by the support 16. That is, the support 16 may comprise lateral walls 22 for positioning or holding/centering the tube 18 on the surface plane 20.

The first pinching device 10 comprises a first pinching member 24 in the form of a roller arranged for being placed against the flexible tube 18 on the side opposite to the support 16. The pinching member 24 is mounted on a holder 26 and is arranged to be lowered towards the surface plane 20 for pinching closed the flexible tube 18 arranged on the support 16. In FIG. 1, the flexible tube 18 is pinched closed at a first position A by the first pinching member 24.

The second pinching device 12 comprises a second pinching member 28 arranged for being lowered towards the surface plane 20. For example, the second pinching member 28 is a roller mounted on a holder 30. In FIG. 1, the second pinching member 28 pinches closed the flexible tube 18 at a second position B at a distance L from the first position A. Thus, at the positions A, B, the tube 18 is flattened and pressed against the surface plane 20.

A circumferential weld seam 32 of the flexible tube 18 is positioned in a non-pinched section of the tube section between positions A and B.

A displacement sensor 34 of the deformation test device 14 is mounted on a holder and is arranged to be placed against the flexible tube 18 between the first and second pinching devices 10, 12. In FIG. 1, a contact member 36 of the displacement sensor 34 contacts the wall of the flexible tube 18 from the outside and opposite to the support 16. Preferably, the tube weld seam 32 is arranged in the vicinity of the contact member 36 but slightly offset therefrom.

The roller or first pinching member 24 is rotatably mounted to the holder 26. The holder 26 is arranged for being movable towards the second pinching device 12. For example, the holder 26 is mounted on a guiding member 38 (see the example of FIG. 2) or guiding rail to be movable parallel to the surface plane 20 in the longitudinal direction of the support 16 and tube 18. Thus, the pinching member 24 is movable with respect to the support 16.

Using the tube weld seam test device, the tube weld seam 32 may be tested for leaks as is explained below.

The pinching members 24, 28 and, optionally, the displacement sensor 34 or contact member 36 are each positioned in a respective upper non-restricting position in order to allow introducing the flexible tube. The flexible tube 18 is arranged on the surface plane 20, the weld seam 32 to be tested being positioned between the pinching devices 10, 12 and next to the displacement sensor 34. A gas, for example air, fills the flexible tube 18.

The flexible tube 18 is pinched closed at the first position A and the second position B by lowering the pinching members 24, 28 towards the support 16. Thereby, a gas volume is enclosed in the non-pinched closed tube section of length L between the first and second positions A, B.

For example, the displacement sensor 34 is placed against the wall of said tube section, the contact member 36 contacting the tube 18. For example, a reference measurement of the position of the contact member 36 is performed.

By forcibly moving the holder 26 and the first pinching member 24 in a direction C towards the second pinching device 12, the position, at which the roller pinches closed the tube 18, is moved. Thereby, the tube section between positions A and B is partly compressed. Specifically, in the case of the tube having a circular cross-section, by moving the pinching member 24 by a distance D, the volume of the enclosed tube section decreases by approximately $\delta V = D \pi r^2$, wherein r is the radius of the internal volume of the non-pinched tube.

Thus, the pressure inside the tube section is expected to increase in accordance with the reduction of its volume. An increasing internal pressure will lead to a radial expansion of the tube section due to the resilient flexibility of the tube 18.

For example, a second measurement of a displacement of the contact member 36 with respect to the reference position is performed. Based on the tested deformation, the tube weld seam 32 may be classified as good or bad; if, for a given distance D, an expected minimal deformation is confirmed by the measurement, this indicates that the tube weld seam 32 is tight. If, however, the measured deformation is too low, this may indicate a leak. Preferably, the measurement is made with a certain time delay after the compression, so that, in case of a leak, there is time enough for a sufficient amount of air to leak out.

For example, more than one test measurement may be performed for different levels of compression of the tube section. This may allow detecting a leak which opens at a certain internal pressure of the tube section.

Another measurement concept may comprise measuring the deformation immediately after compression and then continuously measuring the deformation for a certain time so as to see whether the deformation remains constant (no leak) or decays with time (leak).

The above described linear dependency of the volume reduction and the length D of moving the first pinching member 24 facilitates calibrating a test pressure for performing the weld seam test.

The tube weld test seam device of FIG. 1 is, for example, a table top unit.

FIG. 2 shows an example of the tube weld seam test device of FIG. 1 forming a hand tool having a handle 42. A button 44 for activation of the tube weld seam test device is, for example, arranged at a front side of the handle 42 to be pressed with a finger. For example, the handle 42 is arranged below and rearward of the support 16. For example, the support 16 extends transversally above and in front of the area of the handle 42.

For example, the flexible tube 18 may be introduced laterally into the space between the support 16 and the pinching members 24, 28. In FIG. 2, the first pinching member 24 is shown in a slightly lowered position in contact with the flexible tube 18. By forcibly further lowering the pinching member 24 into a position shown by dashed lines in FIG. 2, the tube 18 may be pinched closed.

In the example of FIG. 2, the holder 26 holding the first pinching member 24 is slideably mounted to a guiding member 38 extending transversally above the handle 42. For reasons of clarity, the second pinching device 12 is not shown in FIG. 2. For example, a base member 46 of the hand tool or handheld device connects the support 16 and the guiding member 38 to the handle 42.

The pinching members 24, 28 may lowered manually, and the pinching member 24 may be moved manually towards the pinching device 12.

In an alternative embodiment, the device may include one or more motors and a control unit, so that the entire test process may be automated. Then the user just has to grip the tube section to be tested with the caliper-like test device and press the button 44 so as to trigger the test process. The test results (good or defective) may be signaled optically or acoustically. The control unit may comprise input means for setting the test pressure in accordance with the type of tube to be tested.

For example, the displacement sensor 34 may comprise a micrometer gauge or micrometer screw for measuring the position of the tip of the contact member 36. For example, the micrometer screw may form the contact member 36. For example, a measurement is performed by placing the contact member 36 against the flexible tube 18 and taking a reading from the micrometer screw.

As an alternative, the displacement sensor 34 may include an electronic sensor (e.g. a magnetic hall-effect sensor) detecting the movement of the contact member 36. In yet another embodiment, the displacement sensor 34 may comprise a resistance strain gauge. For example, the resistance strain gauge may be attached circumferentially to an expandable collar that surrounds the tube and is expanded and contracted in accordance with the deformations of the tube wall.

In a further example, the pressure test device 14 may comprise a pressure sensor for testing a pressure received by the contact member 36. For example, when the contact member 36 is placed against the flexible tube 18 in a fixed position, an increasing internal pressure of the tube section between positions A and B may be transmitted through the tube wall to the contact member 36. Thus, the internal pressure of the tube section may be tested without requiring an outward deformation of the wall of the flexible tube 18 at the contact member 36.

The invention claimed is:

1. A tube weld seam test device for testing a tube weld seam (32) of a flexible tube (18) for leaks, comprising:
    a first pinching device (10) and a second pinching device (12) for pinching closed the flexible tube (18) at a first position (A) and at a second position (B) distant from the first position (A);
    a compressing mechanism (26) arranged for partly compressing a tube section enclosed between the first and second pinching devices (10; 12), when the tube (18) is pinched closed by the first and second pinching devices (10; 12); and
    a pressure test device (14) arranged for testing an internal pressure of said tube section;
    wherein the compressing mechanism comprises at least one moveable pinching member (24) of the first pinching device (10), said pinching member (24) being forcibly moveable towards the second pinching device (12) while pinching closed the flexible tube (18).

2. The tube weld seam test device according to claim 1, wherein the pressure test device (14) is constituted to measure deformation of the tube.

3. The tube weld seam test device according to claim 1, wherein the compressing mechanism (26) is adapted for shortening a length (L) of a non-pinched section of the flexible tube (18) between the first and second pinching devices (10; 12).

4. The tube weld seam test device according to claim 1, wherein the moveable pinching member (24) comprises a roller.

5. The tube weld seam test device according to claim 1, further comprising a support (16) for the flexible tube (18), the support (16) extending at least between the first and second pinching devices (10; 12) for supporting the flexible tube (18) during testing the tube weld seam (32).

6. The tube weld seam test device according to claim 5, wherein the first pinching device (10) comprises a pinching member (24) for pinching closed the flexible tube (18) between the pinching member (24) and the support (16), and
wherein the second pinching device (12) comprises a second pinching member (28) for pinching closed the flexible tube (18) between the second pinching member (28) and the support (16).

7. The tube weld seam test device according to claim 1, wherein the pressure test device (14) comprises a displacement or pressure sensor (34) arranged to be placed against the flexible tube (18) from outside.

8. The tube weld seam test device according to claim 1, wherein the pressure test device (14) is a deformation test device arranged for measuring a deformation of said tube section.

9. A method of testing a weld seam (32) of a flexible tube (18) for leaks, comprising:
pinching closed the flexible tube (18) at a first position (A) and at a second position (B), the tube weld seam (32) to be tested being located between the first and second positions (A; B);
partly compressing a tube section between the first and second positions (A; B); and
testing an internal pressure of the tube section;
wherein the step of partly compressing said tube section comprises moving at least the first position (A), at which the flexible tube (18) is pinched closed, towards the second position (B), thereby shortening a length (L) of the tube section between the first and second positions (A; B).

10. The method according to claim 9, wherein the testing of the internal pressure takes place by measuring deformation of the tube.

11. The method according to claim 9, wherein in the step of pinching closed the flexible tube (18) at the first position (A), a pinching member (24) is used for pinching closed the flexible tube (18) at the first position (A), and wherein the step of partly compressing the tube section comprises moving said pinching member (24) along the flexible tube (18), thereby moving the first position (A), at which the pinching member (24) pinches closed the flexible tube (18), towards the second position (B).

12. The method according to claim 11, wherein the pinching member (24) comprises a roller.

13. The method according to claim 9, wherein in the step of testing an internal pressure of the tube section, a displacement or pressure sensor (34) is used which is placed against the flexible tube (18) from outside.

14. The tube weld seam test device according to claim 2, wherein the compressing mechanism (26) is adapted for shortening a length (L) of a non-pinched section of the flexible tube (18) between the first and second pinching devices (10; 12).

15. The tube weld seam test device according to claim 6, wherein the pressure test device (14) comprises a displacement or pressure sensor (34) arranged to be placed against the flexible tube (18) from outside.

16. The tube weld seam test device according to claim 7, wherein the pressure test device (14) is a deformation test device arranged for measuring a deformation of said tube section.

17. The method according to claim 10, wherein the step of partly compressing said tube section comprises moving at least the first position (A), at which the flexible tube (18) is pinched closed, towards the second position (B), thereby shortening a length (L) of the tube section between the first and second positions (A; B).

18. The method according to claim 12, wherein in the step of testing an internal pressure of the tube section, a displacement or pressure sensor (34) is used which is placed against the flexible tube (18) from outside.

19. A tube weld seam test device for testing a tube weld seam (32) of a flexible tube (18) for leaks, comprising:
a first pinching device (10) and a second pinching device (12) for pinching closed the flexible tube (18) at a first position (A) and at a second position (B) distant from the first position (A);
a compressing mechanism (26) arranged for partly compressing a tube section enclosed between the first and second pinching devices (10; 12), when the tube (18) is pinched closed by the first and second pinching devices (10; 12); and
a pressure test device (14) arranged for testing an internal pressure of said tube section;
wherein the compressing mechanism (26) is adapted for shortening a length (L) of a non-pinched section of the flexible tube (18) between the first and second pinching devices (10; 12).

20. The tube weld seam test device according to claim 19, wherein the pressure test device (14) is constituted to measure deformation of the tube.

* * * * *